United States Patent
Li

(10) Patent No.: US 11,736,647 B2
(45) Date of Patent: Aug. 22, 2023

(54) DEVICE AND METHOD FOR CALIBRATING A SCANNED IMAGE ORIENTATION AND OUTPUTTING THE CALIBRATED SCANNED IMAGE

(71) Applicant: AVISION INC., Hsinchu (TW)

(72) Inventor: Chen-Chang Li, Miaoli County (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 17/732,562

(22) Filed: Apr. 29, 2022

(65) Prior Publication Data

US 2022/0360685 A1 Nov. 10, 2022

(30) Foreign Application Priority Data

May 4, 2021 (TW) .................................. 110115955

(51) Int. Cl.
*H04N 1/387* (2006.01)
*H04N 1/00* (2006.01)

(52) U.S. Cl.
CPC ....... *H04N 1/3877* (2013.01); *H04N 1/00005* (2013.01); *H04N 1/0009* (2013.01); *H04N 1/00018* (2013.01); *H04N 1/00068* (2013.01); *H04N 1/00087* (2013.01); *H04N 1/3872* (2013.01)

(58) Field of Classification Search
None
See application file for complete search history.

(56) References Cited

U.S. PATENT DOCUMENTS

| 6,041,205 | A | 3/2000 | Funada |
| 10,469,684 | B2 | 11/2019 | Sheng |
| 11,140,286 | B2 * | 10/2021 | Wilson ............... H04N 1/00771 |

FOREIGN PATENT DOCUMENTS

TW I664851 B 7/2019

* cited by examiner

*Primary Examiner* — Scott A Rogers
(74) *Attorney, Agent, or Firm* — Winston Hsu

(57) ABSTRACT

An image outputting device includes a scanning module, a storage module, an identification module, a calibration module and a printing module. The scanning module generates an image by scanning an object. The storage module stores the image. The identification module identifies a layout orientation and a text orientation of the image. The calibration module calibrates the layout orientation and the text orientation of the image according to a relation of an identification result of the identification module and a layout orientation of the printing medium. When the printing module prints the calibrated image on a printing surface of the printing medium and outputs the printing medium with the printing surface facing downwardly, the layout orientation of the printed image matches with the layout orientation of the printing medium, and the text orientation of the printed image is opposite to an medium outputting direction or arranged from proximal to distal.

6 Claims, 7 Drawing Sheets

DEVICE AND METHOD FOR CALIBRATING A SCANNED IMAGE ORIENTATION AND OUTPUTTING THE CALIBRATED SCANNED IMAGE

BACKGROUND OF THE DISCLOSURE

1. Field of the Disclosure

The present invention relates to an image outputting device capable of calibrating a scanned image and a related method of calibrating and outputting a scanned image, and more specifically, to an image outputting device capable of calibrating a scanned image according to users' habits and reading directions and a related method of calibrating and outputting a scanned image.

2. Description of the Prior Art

With advancement of technology, multi-function peripherals which have functions of scanning and printing are widely used in homes or offices. The multi-function peripheral usually includes a scanning module for capturing images of physical objects, such as documents, photographs, and books, and a printing module for printing a corresponding digital image data.

The scanning modules can be usually divided into two categories of flatbed scanners and sheet-fed scanners depending on different using modes. The sheet-fed scanner can feed paper automatically. Therefore, it is suitable for scanning a large number of single-page documents. However, when some of the single-page documents are unintentionally misplaced in an improper orientation, scanned images or printed pages of the documents have different orientations.

On the other hand, the flatbed scanner is suitable for scanning bound documents or books. The bound document or the book cannot be fed by an automatic document feeder of the sheet-fed scanner if the bound document or the book is not torn apart. However, when it is desired to use the flatbed scanner to scan the book, the open book cannot be flattened, and a portion of a scanned page near a binder of the book cannot be closely attached onto a scanning platform of the flatbed scanner. Therefore, a scanned image of the scanned page may be unclear or has a dark portion. Sometimes, a user may use a flatbed scanner with a slope to allow the binder of the book to rest thereon for flattening the book to generate a clear scanned image. However, for cooperating with the flatbed scanner with the slope, the book has to be rotated by 180 degrees when alternately scanning odd and even pages of the book. Therefore, scanned images of the odd and even pages have different orientations, which is not convenient in use.

SUMMARY OF THE DISCLOSURE

Therefore, it is an objective of the present invention to provide an image outputting device capable of calibrating a scanned image according to users' habits and reading directions and a related method of calibrating and outputting a scanned image for solving the aforementioned problem.

In order to achieve the aforementioned objective, the present invention discloses an image outputting device capable of calibrating a scanned image. The image outputting device includes a scanning module, a storage module, an identification module, a calibration module, a printing module and a control unit. The scanning module is configured to scan an object to generate the scanned image. The storage module is configured to store the scanned image generated by the scanning module. The identification module is configured to identify an orientation of the scanned image. The orientation includes a layout orientation and a text orientation. The calibration module is configured to calibrate the orientation of the scanned image stored in the storage module. The printing module is configured to print the calibrated scanned image on a printing surface of a printing medium and to output the printing medium with the printing surface facing downwardly. The control unit is electrically connected to the scanning module, the storage module, the identification module, the calibration module and the printing module. The control unit controls the scanning module to scan the object to generate the scanned image and store the scanned image in to the storage module. The control unit further controls the identification module to identify the layout orientation and the text orientation of the scanned image. The control unit further controls the calibration module to calibrate the layout orientation and the text orientation of the scanned image according to a relation of an identification result of the identification module and a layout orientation of the printing medium. When the control unit controls the printing module to print the calibrated scanned image on the printing surface of the printing medium and to output the printing medium with the printing surface facing downwardly, the layout orientation of the printed scanned image matching with the layout orientation of the printing medium, and the text orientation of the printed scanned image being opposite to a medium outputting direction or arranged from a proximal end to a distal end of the printing surface of the printing medium.

According to an embodiment of the present invention, the identification module identifies the text orientation of the scanned image stored in the storage module by optical character recognition or optical graph recognition.

According to an embodiment of the present invention, the control unit further controls the identification module to identify a layout size of the scanned image for determining whether the layout size of the scanned image is less than a layout size of the printing medium. When the control unit determines the layout size of the scanned image is less than the layout size of the printing medium, the control unit controls the printing module to print the calibrated scanned image at a central position on the printing surface of the printing medium.

In order to achieve the aforementioned objective, the present invention further discloses a method of calibrating and outputting a scanned image by an image outputting device. The method includes a control unit controlling a scanning module to scan an object to generate the scanned image and storing the scanned image in a storage module; the control unit controlling an identification module to identify a layout orientation and a text orientation of the scanned image stored in the storage module; the control unit controlling a calibration module to calibrate the layout orientation and the text orientation of the scanned image according to a relation of an identification result of the identification module and a layout orientation of a printing medium; and the control unit controlling a printing module to print the calibrated scanned image on a printing surface of the printing medium and to output the printing medium with the printing surface facing downwardly, wherein when the control unit controls the printing module to print the calibrated scanned image on the printing surface of the printing medium and to output the printing medium with the printing surface facing downwardly, the layout orientation of the printed scanned image matches with the layout orientation of the printing medium, and the text orientation of the printed scanned image is opposite to a medium outputting direction or arranged from a proximal end to a distal end of the printing surface of the printing medium.

According to an embodiment of the present invention, the control unit controlling the identification module to identify the layout orientation and the text orientation of the scanned image stored in the storage module includes the identification module identifying the text orientation of the scanned image stored in the storage module by optical character recognition or optical graph recognition.

According to an embodiment of the present invention, the method further includes the control unit controlling the identification module to identify a layout size of the scanned image for determining whether the layout size of the scanned image is less than a layout size of the printing medium; and the control unit controlling the printing module to print the calibrated scanned image at a central position on the printing surface of the printing medium when the control unit determines the layout size of the scanned image is less than the layout size of the printing medium.

In summary, in the present invention, the control unit can control the calibration module to calibrate the layout orientation and the text orientation of the scanned image according to the relation of the identification result of the identification module and the layout orientation of the printing medium, so that when the control unit controls the printing module to print the calibrated scanned image on the printing surface of the printing medium and to output the printing medium with the printing surface facing downwardly, the layout orientation of the printed scanned image matches with the layout orientation of the printing medium, and the text orientation of the printed scanned image is opposite to the medium outputting direction or arranged from the proximal end to the distal end of the printing surface of the printing medium. In such a way, when a user takes the printing medium and turns the printing surface to face upwardly, the text orientation of the calibrated scanned image on the printing surface coincides with a reading orientation. Therefore, it is not required to rotate the printing medium, which makes it more intuitive to use the image outputting device of the present invention. Besides, when scanning a plurality of objects with different placing orientations, layout orientations and text orientations of calibrated scanned images can be identical. Therefore, it is not required to rotate any printing medium, which brings convenience in use. Furthermore, when the layout size of the scanned image is less than the layout size of the printing medium, the calibrated scanned image can be printed at the central position on the printing surface of the printing medium, which makes reading easier.

These and other objectives of the present disclosure will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
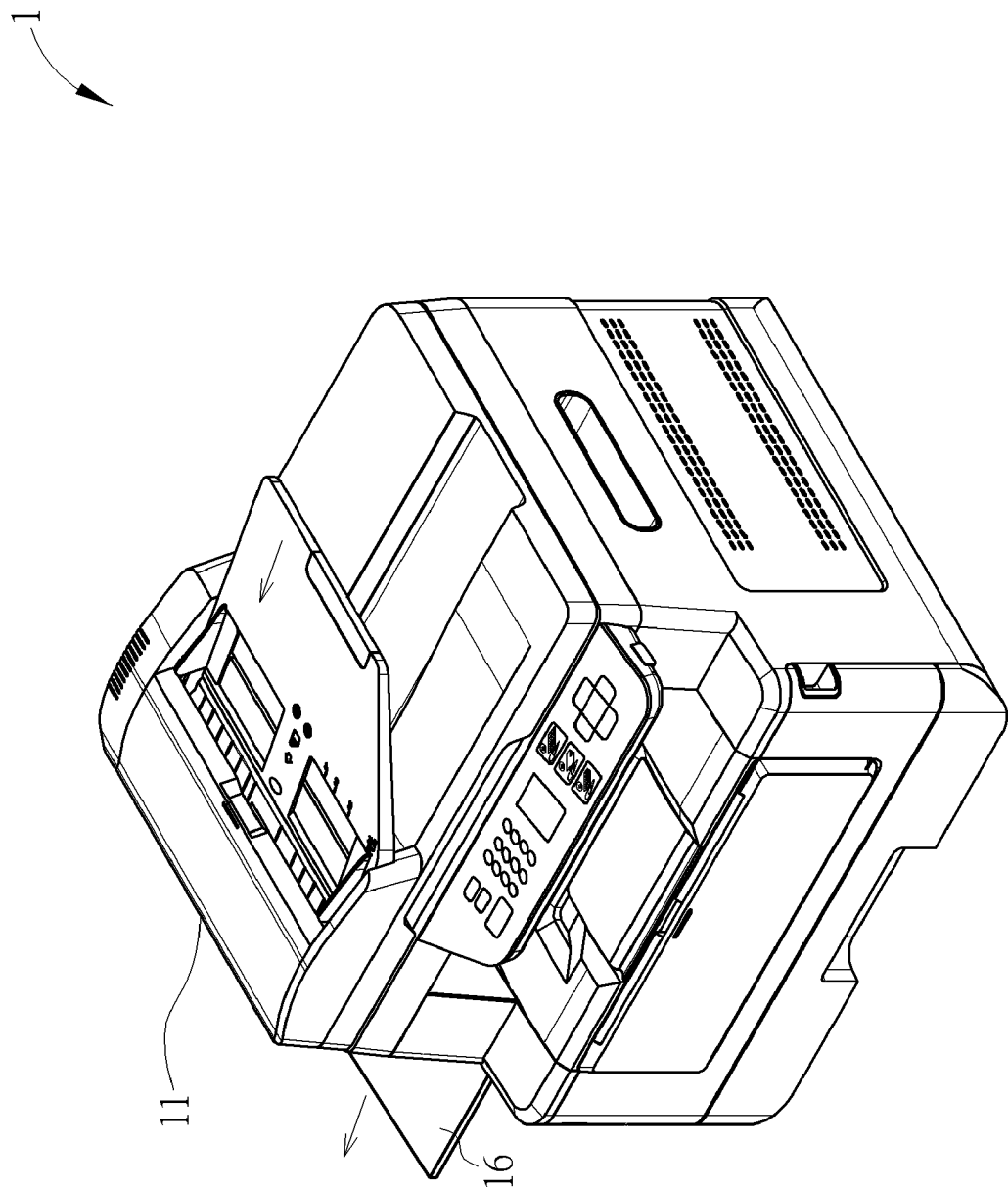
FIG. 1 is a diagram of an image outputting device according to a first embodiment of the present invention.
Figure 2:
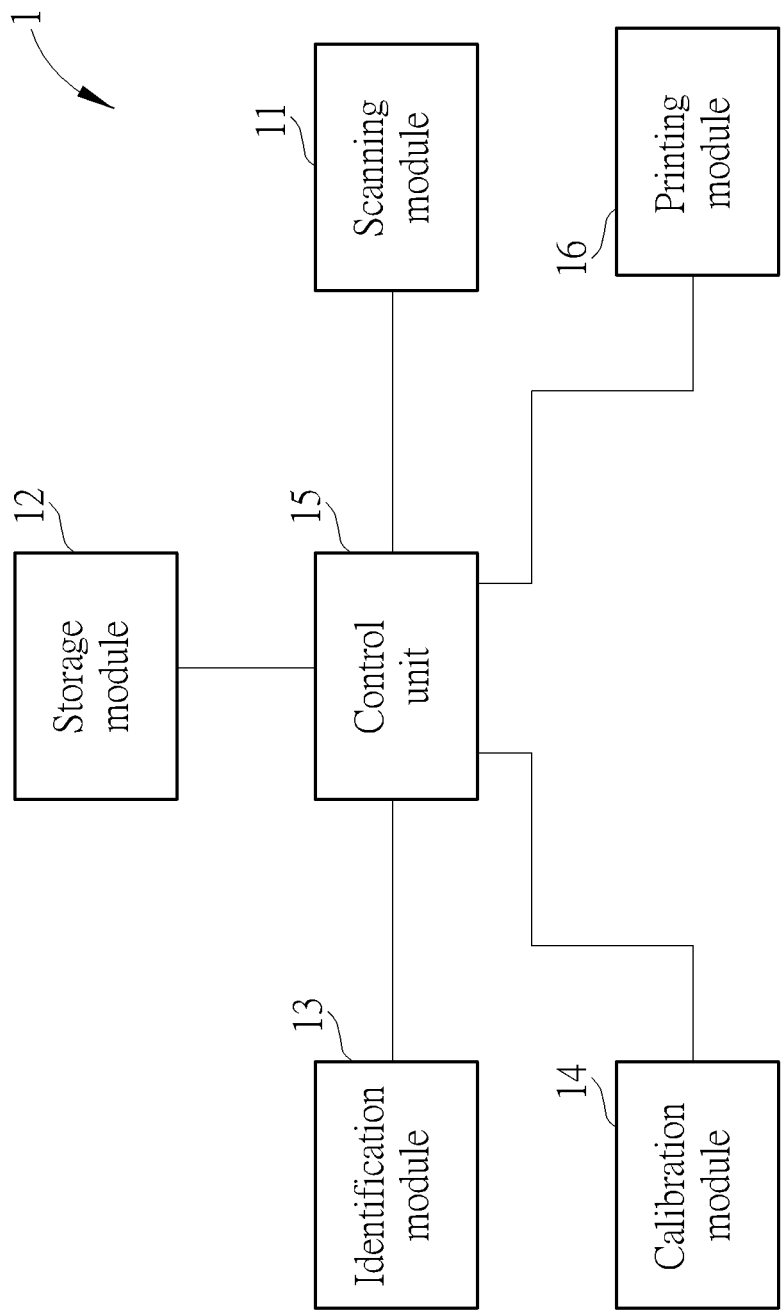
FIG. 2 is a functional block diagram of the image outputting device according to the first embodiment of the present invention.

Please refer to FIG. 1 to FIG. 2. FIG. 1 is a diagram of an image outputting device 1 according to a first embodiment of the present invention. FIG. 2 is a functional block diagram of the image outputting device 1 according to the first embodiment of the present invention. As shown in FIG. 1 and FIG. 2, in this embodiment, the image outputting device 1 can be a copy device, such as a multi-function peripheral, and has functions of calibrating and outputting scanned images. The image outputting device 1 includes a scanning module 11, a storage module 12, an identification module 13, a calibration module 14, a control unit 15 and a printing module 16. The scanning module 11 is configured to scan an object to generate a scanned image corresponding to the object. The storage module 12 is configured to store the scanned image generated by the scanning module 11. The identification module 13 is configured to identify an orientation of the scanned image, wherein the orientation includes a layout orientation and a text orientation. The layout orientation of the scanned image usually corresponds to a placing orientation of the object, such as a portrait orientation or a landscape orientation. The text orientation of the scanned image usually corresponds to a text orientation of the object, such as a character orientation or an arranging orientation of a header section and a footer section. The calibration module 14 is configured to calibrate the layout orientation and the text orientation of the scanned image according to a relation of an identification result of the identification module 13 and a layout orientation of the printing medium. The printing module 16 is configured to print the calibrated scanned image on a printing surface of a printing medium and to output the printing medium with the printing surface facing downwardly along a medium outputting direction. In other words, the printing module 16 is configured to output the printing medium in a manner of that a user cannot see the printing surface when the user is going to take the printing medium. The control unit 15 is electrically connected to the scanning module 11, the storage module 12, the identification module 13, the calibration module 14 and the printing module 16, so as to control operation of the aforementioned modules.

In this embodiment, the scanning module 11 can be a charge coupled device (CCD), a contact image sensor (CIS), or any other image capturing module. The storage module 12 can be a memory, a hard disk drive or any other storage medium for storing data. The identification module 13 and the calibration module 14 can be in form of programmable circuit boards or application-specific integrated circuits. The control unit 15 can be a microprocessor, a micro control unit (MCU), a digital signal processor (DSP), or any other computing processor. The printing module 16 can include a printing head for executing printing tasks and a roller set for driving the printing medium to move.

Figure 3:
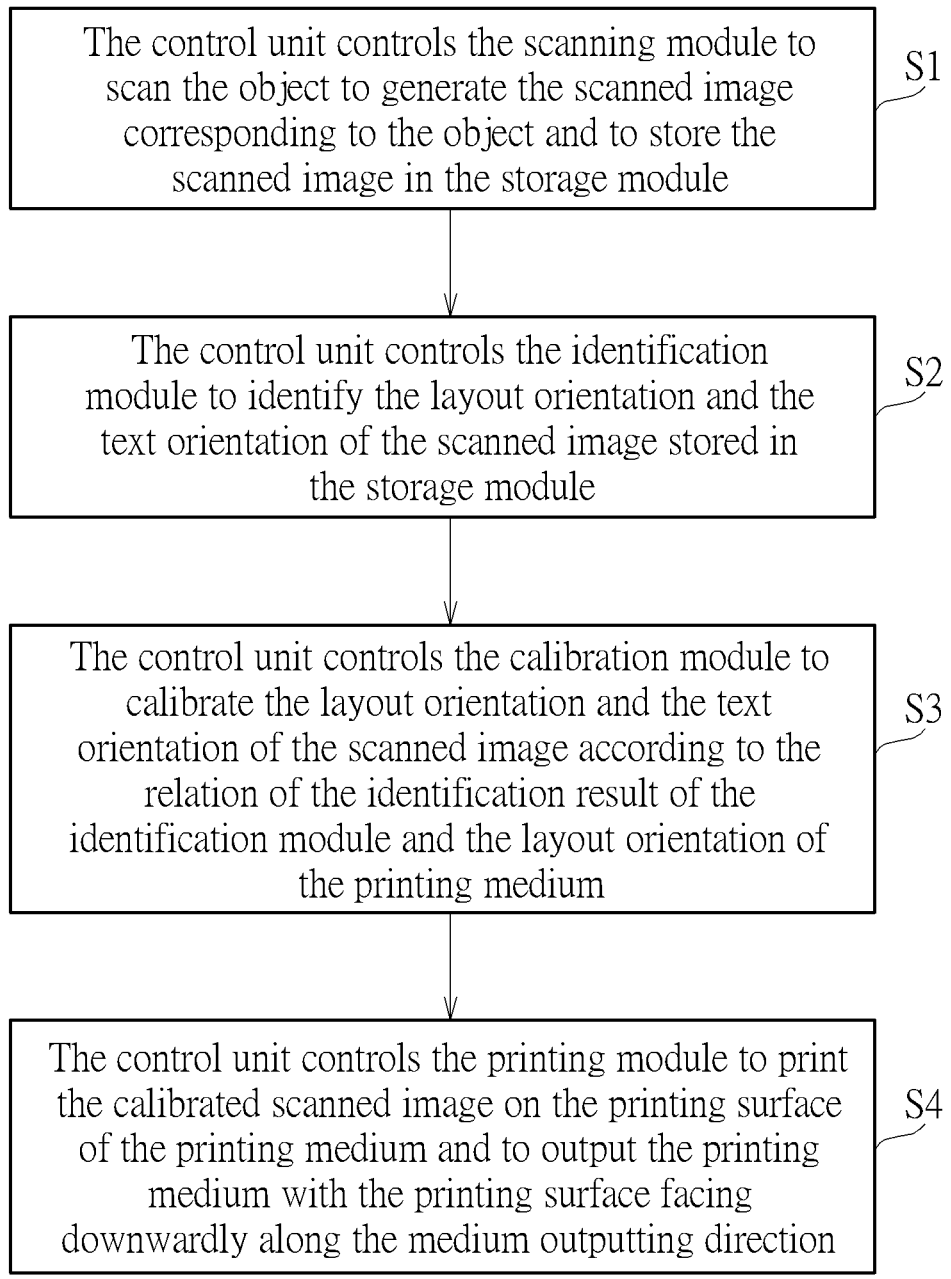
FIG. 3 is a flow chart of a method of calibrating and outputting a scanned image by the image outputting device according to the first embodiment of the present invention.

Please refer to FIG. 3. FIG. 3 is a flow chart of a method of calibrating and outputting the scanned image by the image outputting device 1 according to the first embodiment of the present invention. As shown in FIG. 3, the method includes the following steps:

Step S1: the control unit 15 controls the scanning module 11 to scan the object to generate the scanned image corresponding to the object and to store the scanned image in the storage module 12;

Step S2: the control unit 15 controls the identification module 13 to identify the layout orientation and the text orientation of the scanned image stored in the storage module 12;

Step S3: the control unit 15 controls the calibration module 14 to calibrate the layout orientation and the text orientation of the scanned image according to the relation of the identification result of the identification module 13 and the layout orientation of the printing medium; and Step S4: the control unit 15 controls the printing module 16 to print the calibrated scanned image on the printing surface of the printing medium and to output the printing medium with the printing surface facing downwardly along the medium outputting direction.

Figure 4:
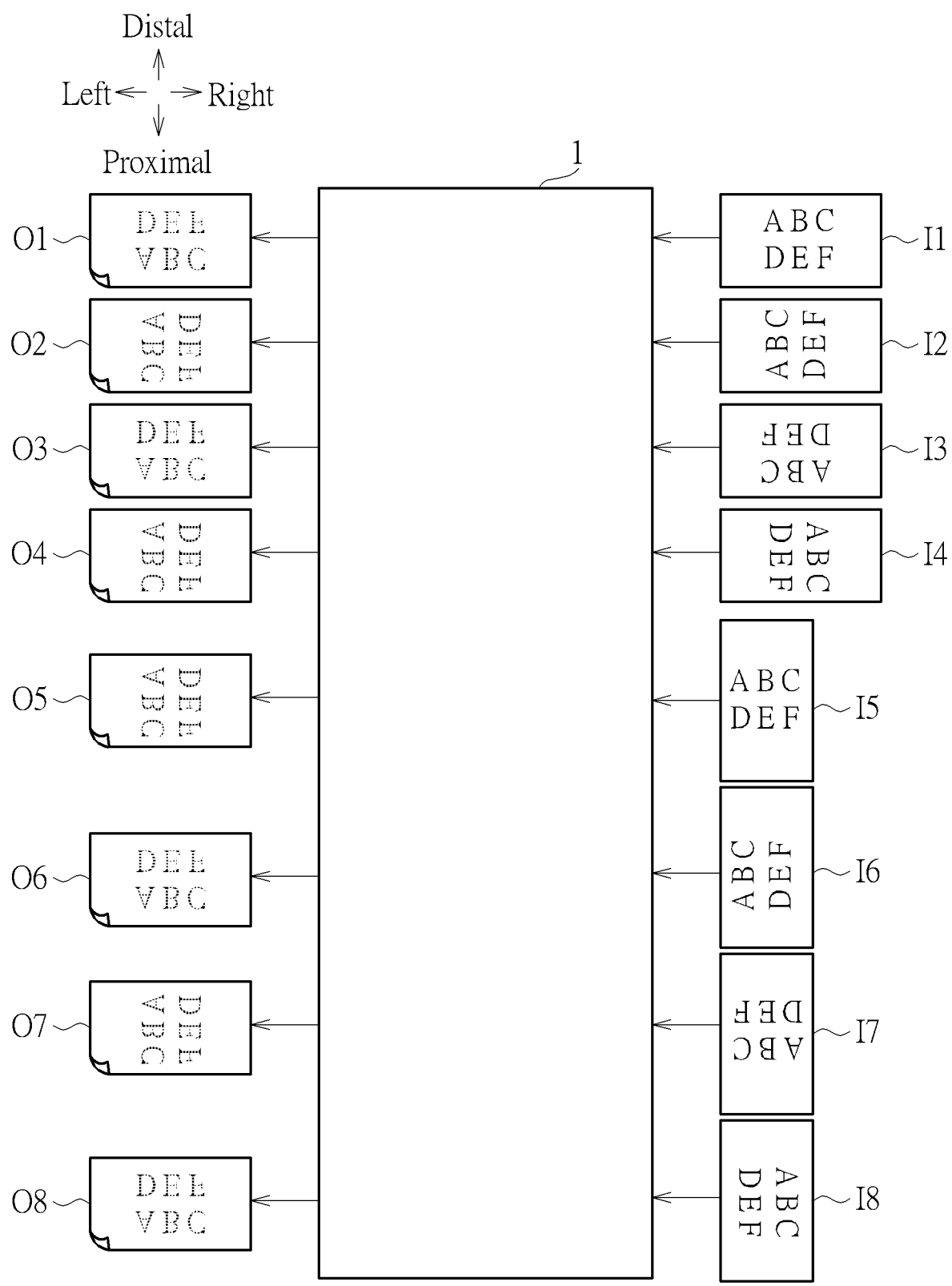
FIG. 4 is a diagram of illustrating that the image outputting device calibrates and outputs the scanned images according to the first embodiment of the present invention.

Detailed description for the aforementioned steps is provided as follows. Please refer to FIG. 3 and FIG. 4. FIG. 4 is a diagram illustrating that the image outputting device 1 calibrates and outputs the scanned images according to the first embodiment of the present invention. Taking FIG. 4 as an example, the control unit 15 can control the scanning module 11 to scan eight objects I1-I8 with different placing orientations to generate eight scanned images respectively corresponding to the eight objects I1-I8 at different time points and to store the eight scanned images respectively in the storage module 12 (step S1). The eight objects I1-I8 can be eight objects in one or different scanning tasks, e.g., the eight objects I1-I8 can be eight pages of a book or a document or eight pages of different books or different documents. However, the present invention is not limited thereto. Afterwards, the control unit 15 can control the identification module 13 to identify a layout orientation and a text orientation of each of the scanned images stored in the storage module 12 (step S2). The identification module 13 can identify an orientation of at least one of a specific character, a number and a picture included in each of the scanned images by optical character recognition or optical graph recognition, so as to identify the text orientation of each of the scanned images stored in the storage module 12. For example, the identification module 13 can identify an orientation of a page number at a corner of each of the scanned images, an orientation of a text character of each of the scanned images, or an arranging direction of two sections of each of the scanned images respectively corresponding to a header section and a footer section of each of the objects I1-I8, so as to identify the text orientation of each of the scanned images. Furthermore, the identification module 13 can identify an image size of each of the scanned images stored in the storage module 12 by optical recognition, so as to identify the layout orientation of each of the scanned images.

Then, the control unit 15 can control the calibration module 14 to calibrate the layout orientation and the text orientation of each of the scanned images according to the relation of the identification result of the identification module 13 and the layout orientation of each of the printing media O1-O8 (step S3), and the control unit 15 can control the printing module 16 to print the calibrated scanned images on printing surfaces of the printing media O1-O8 respectively and to output the printing media O1-O8 with their printing surfaces facing downwardly along the medium outputting direction, i.e., from right to left. It should be noticed that when the control unit 15 controls the printing module 16 to print the calibrated scanned image on the printing surface of the printing medium and to output the printing medium with the printing surface facing downwardly along the medium outputting direction, the layout orientation of the printed scanned image matches with the layout orientation of the printing medium, and the text orientation of the printed scanned image is opposite to the medium outputting direction, i.e., arranged from a left end to a right end of the printing surface of the printing medium, or arranged from a proximal end to a distal end of the printing surface of the printing medium. The left end and the right end of the printing surface are respectively adjacent to a left end and a right end of a user. The proximal end of the printing medium is close to the user, and the distal end of the printing medium is away from the user.

For example, as shown in FIG. 4, the layout orientation of each of the four scanned images respectively corresponding to a first object I1 to a fourth object I4 of the eight object I1-I8 matches with the layout orientation of each of a first printing medium O1 to a fourth printing medium O4 of the printing media O1-O8. The text orientation of the scanned image corresponding to the first object I1 is arranged from a distal end to a proximal end thereof. The text orientation of the scanned image corresponding to a second object I2 is arranged from a left end to a right end thereof, i.e., arranged along a direction opposite to a medium inputting direction of the scanning module 11. The text orientation of the scanned image corresponding to a third object I3 is arranged from a proximal end to a distal end thereof. The text orientation of the scanned image corresponding to the fourth object I4 is arranged from a right end to a left end thereof, i.e., arranged along a direction identical to the medium inputting direction of the scanning module 11. Therefore, the calibration module 14 rotates the scanned images respectively corresponding to the first object I1 and the fourth object I4 by 180 degrees and does not rotate the scanned images respectively corresponding to the second object I2 and the third object I3 according to the relation of the aforementioned identification result of the identification module 13 and the layout orientation of each of the first printing medium O1 to the fourth printing medium O4 of the printing media O1-O8. In such a way, the text orientation of each of the printed scanned images respectively corresponding to the first object I1 and the third object I3 is arranged from a proximal end to a distal end of the printing surface of each of the first printing medium O1 and a third printing medium O3 of the printing media O1-O8, and the text orientation of each of the printed scanned images respectively corresponding to the second object I2 and the fourth object I4 is arranged from a left end to a right end of the printing surface of each of a second printing medium O2 and the fourth printing medium O4 of the printing media O1-O8, i.e., arranged along a direction opposite to the medium outputting direction.

Furthermore, the layout orientation of each of the four scanned images respectively corresponding to a fifth object I5 to an eighth object I8 of the eight objects I1-I8 does not matches with and is perpendicular to the layout orientation of each of a fifth printing medium O5 to an eighth printing medium O8 of the printing media O1-O8. The text orientation of the scanned image corresponding to the fifth object I5 is arranged from a distal end to a proximal end thereof. The text orientation of the scanned image corresponding to a sixth object I6 is arranged from a left end to a right end thereof, i.e., arranged along a direction opposite to the medium inputting direction of the scanning module 11. The text orientation of the scanned image corresponding to a seventh object I7 is arranged from a proximal end to a distal end thereof. The text orientation of the scanned image corresponding to the eighth object I8 is arranged from a right end to a left end thereof, i.e., arranged along a direction identical to the medium inputting direction of the scanning module 11. Therefore, the calibration module 14 rotates the scanned images respectively corresponding to the fifth object I5 and the sixth object I6 by 90 degrees along a counterclockwise direction and rotates the scanned images respectively corresponding to the seventh object I7 and the eighth object I8 by 90 degrees along a clockwise direction according to the relation of the aforementioned identification result of the identification module 13 and the layout orientation of each of the fifth printing medium O5 to the eighth printing medium O8 of the printing media O1-O8. In such a way, the layout orientation of each of the printed scanned images respectively corresponding to the fifth object I5 to the eighth object I8 matches with the layout orientation of each of the fifth printing medium O5 to the eighth printing medium O8 of the printing media O1-O8. Moreover, the text orientation of each of the printed scanned images respectively corresponding to the fifth object I5 and the seventh object I7 is arranged from a left end to a right end of the printing surface of each of the fifth printing medium O5 and a seventh printing medium O7 of the printing media O1-O8, i.e., arranged along a direction opposite to the medium outputting direction, and the text orientation of each of the printed scanned images respectively corresponding to the sixth object I6 and the eighth object I8 is arranged from a proximal end to a distal end of the printing surface of each of a sixth printing medium O6 and the eighth printing medium O8 of the printing media O1-O8.

In this embodiment, when a user takes the printing medium and turns the printing surface to face upwardly, the text orientation of the calibrated scanned image on the printing surface coincides with a reading orientation. Therefore, it is not required to rotate the printing medium, which makes it more intuitive to use the image outputting device of the present invention. Besides, when scanning a plurality of objects with different placing orientations, layout orientations and text orientations of calibrated scanned images are identical. Therefore, it is not required to rotate any printing medium, which brings convenience in use.

In addition, the layout orientation of the printing medium of the present invention is not limited to those illustrated in the figures of the aforementioned embodiment. It depends on practical demands. For example, in another embodiment, the layout orientation of the printing medium can be perpendicular to the layout orientation of the printing medium of the aforementioned embodiment. Besides, the medium outputting direction of the printing module of the image outputting device of the present invention is not limited to the aforementioned embodiment. For example, the printing module of the image outputting device can output the printing medium from distal to proximal or from left to right. Furthermore, in another embodiment, the scanning module can be a flatbed scanner, i.e., the scanning module can be configured to not drive the object to move.

Figure 5:
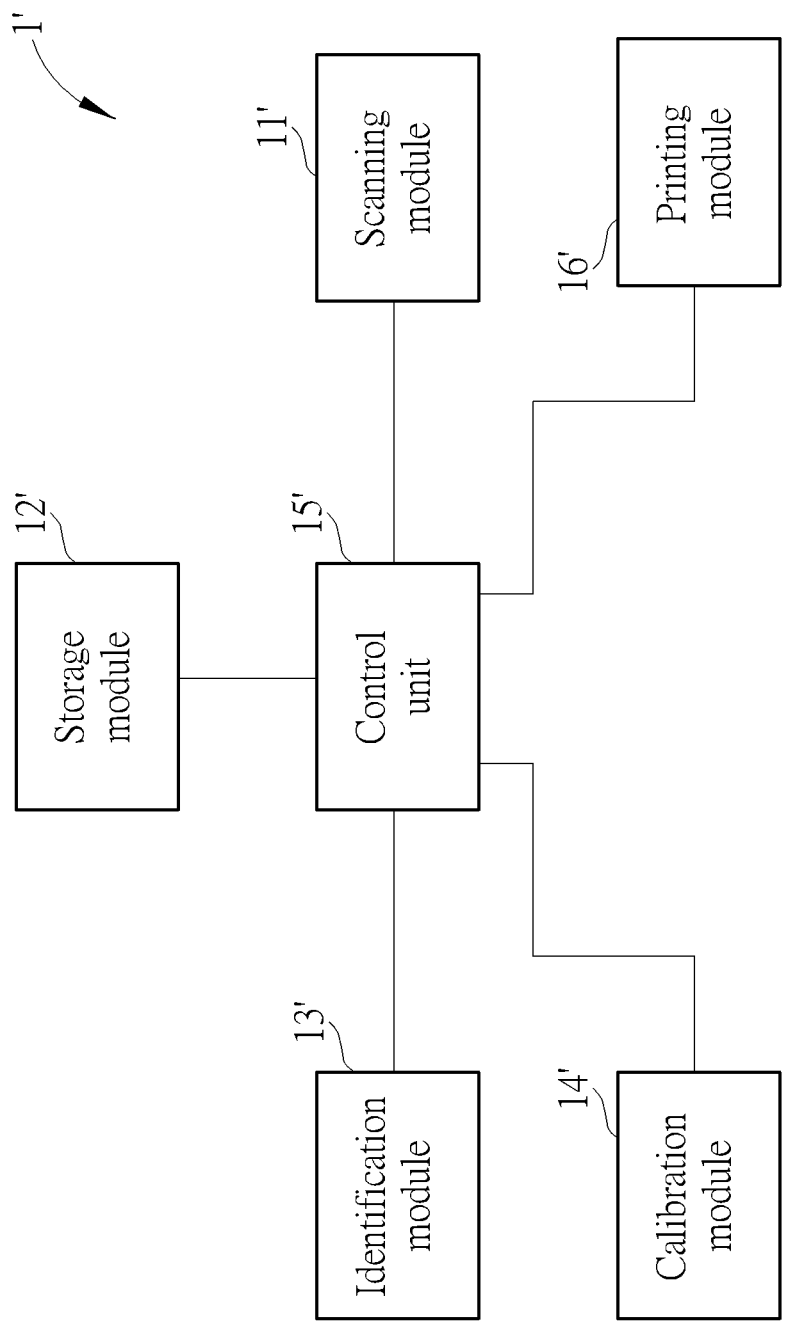
FIG. 5 is a functional block diagram of the image outputting device according to a second embodiment of the present invention.
Figure 6:
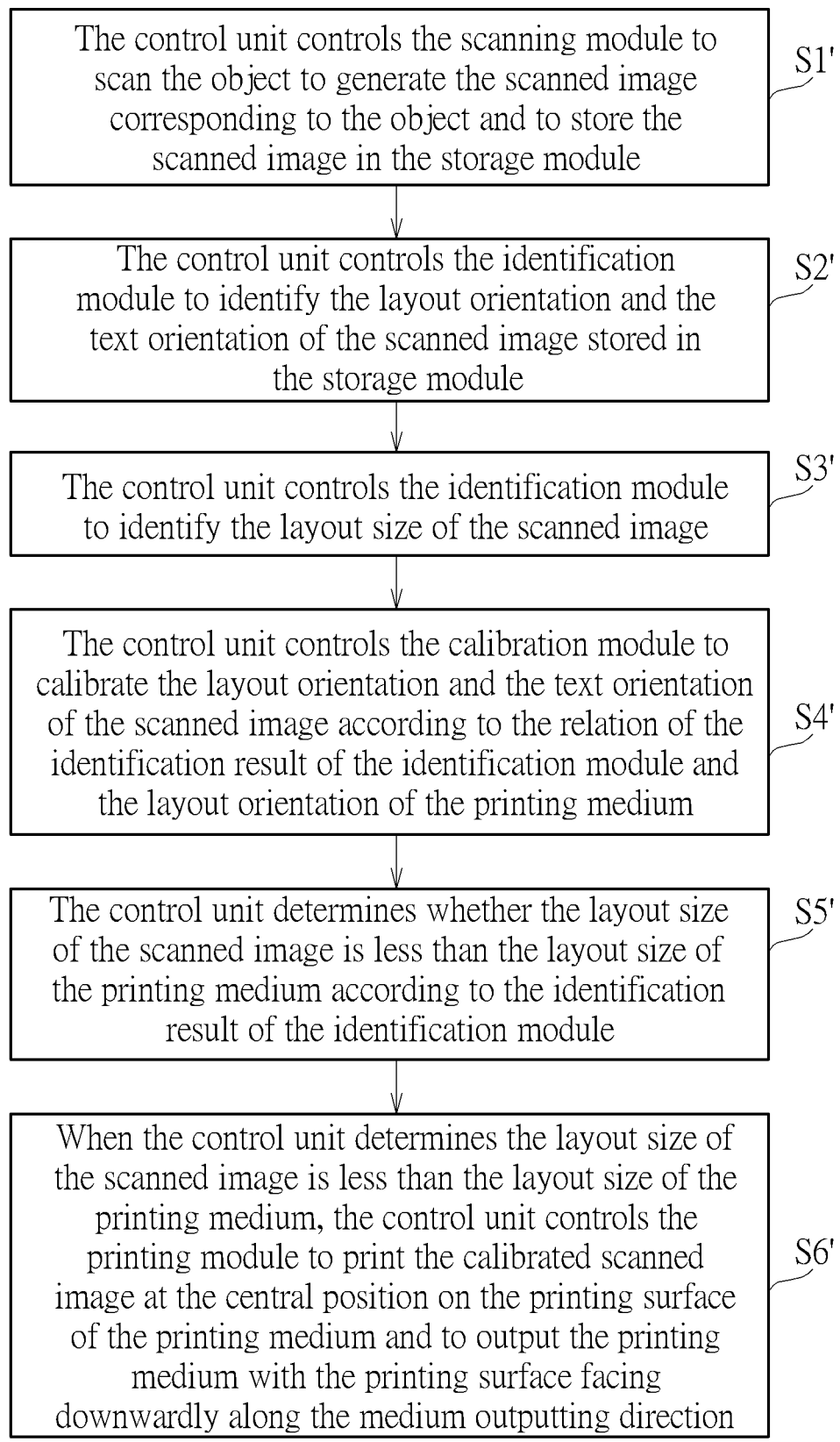
FIG. 6 is a flow chart of a method of calibrating and outputting a scanned image by the image outputting device according to the second embodiment of the present invention.
Figure 7:
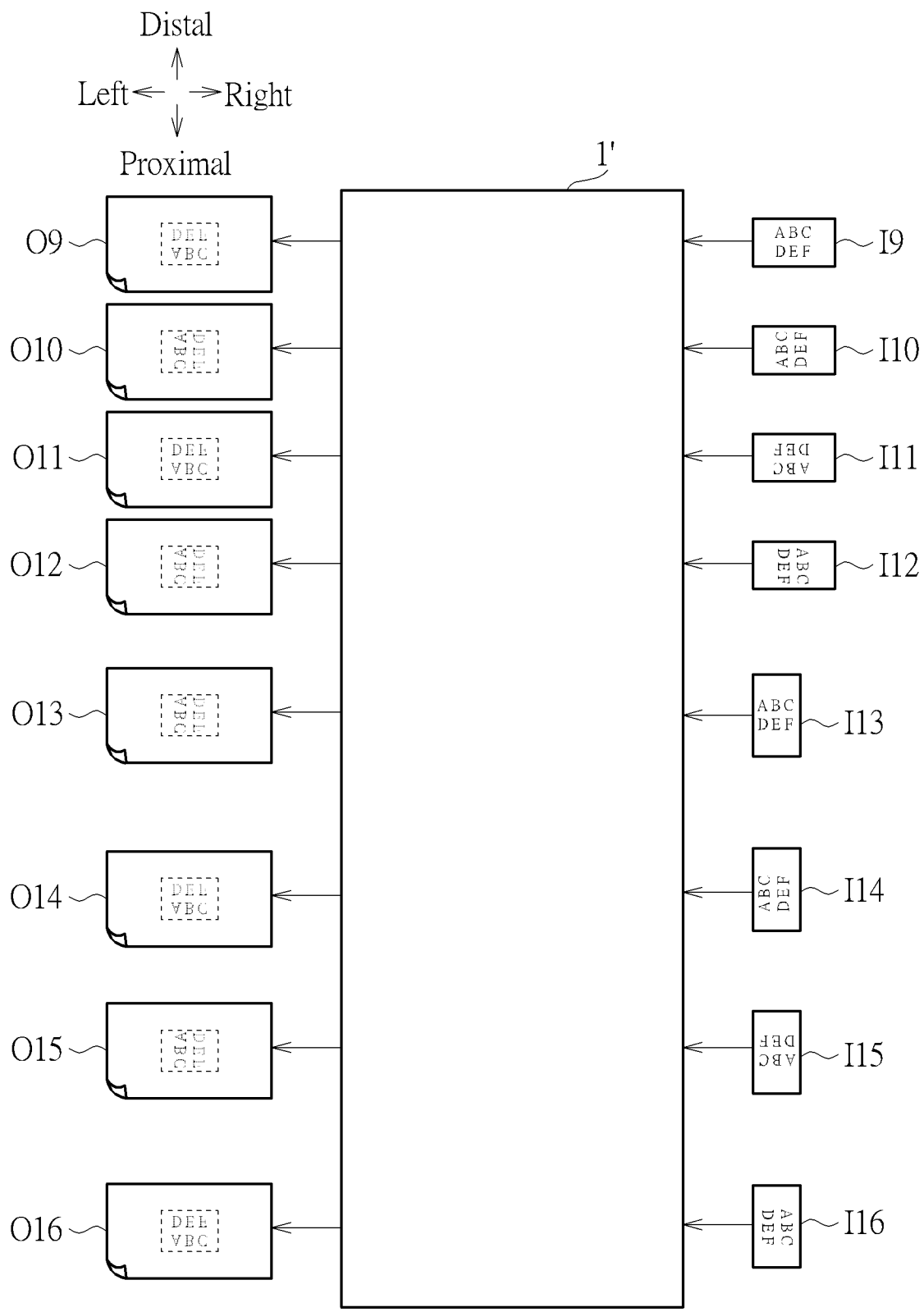
FIG. 7 is a diagram illustrating that the image outputting device calibrates and outputs the scanned images according to the second embodiment of the present invention.

Besides, please refer to FIG. 5 to FIG. 7. FIG. 5 is a functional block diagram of the image outputting device 1' according to a second embodiment of the present invention. FIG. 6 is a flow chart of a method of calibrating and outputting a scanned image by the image outputting device 1' according to the second embodiment of the present invention. FIG. 7 is a diagram illustrating that the image outputting device 1' calibrates and outputs the scanned images according to the second embodiment of the present invention. As shown in FIG. 5 to FIG. 7, in this embodiment, the image outputting device 1' includes a scanning module 11', a storage module 12', an identification module 13', a calibration module 14', a control unit 15' and a printing module 16'. Different from the first embodiment, the control unit 15' can further control the identification module 13' to identify a layout size of the scanned image and determine whether the layout size of the scanned image is less than a layout size of the printing medium. Besides, the control unit 15' can further control the printing module 16' to print the calibrated scanned image at a central position on the printing surface of the printing medium when the control unit 15' determines the layout size of the scanned image is less than the layout size of the printing medium.

Specifically, taking FIG. 7 as an example, when it is desired to copy eight objects I9-I16, the control unit 15' can be used to control the scanning module 11' to scan the eight objects I9-I16 to generate eight scanned images respectively corresponding to the eight objects I9-I16 at different time points and to store the eight scanned images in the storage module 12' (step S1'). After the scanned images respectively corresponding to the objects I9-I16 are stored in the storage module 12', the control unit 15' can not only control the identification module 13' to identify a layout orientation and a text orientation of each of the scanned images stored in the storage module 12 (step S2') but also control the identification module 13' to identify a layout size of each of the scanned images (step S3'). Afterwards, the control unit 15' can control the calibration module 14' to calibrate the layout orientation and the text orientation of each of the scanned images according to the relation of the identification result of the identification module 13' and the layout orientation of each of the printing media O9-O16 (step S4') and determine whether the layout size of each of the scanned images is less than a layout size of each of the printing media O9-O16 (step S5'). When the control unit 15' determines the layout size of each of the scanned images is less than the layout size of each of the printing media O9-O16, the control unit 15' can controls the printing module 16' to print each of the calibrated scanned images at the central position on the printing surface of each of the printing media O9-O16 and to output the printing media O9-O16 with their printing surfaces facing downwardly along the medium outputting direction, i.e., from right to left (step S6'). In this embodiment, when the user takes the printing medium and turns the printing surface to face upwardly, the text orientation of the calibrated scanned image on the printing surface coincides with the reading orientation and the calibrated scanned image is located at the central position on the printing surface. Therefore, the printing medium of the image outputting device has better readability.

In contrast to the prior art, in the present invention, the control unit can control the calibration module to calibrate the layout orientation and the text orientation of the scanned image according to the relation of the identification result of the identification module and the layout orientation of the printing medium, so that when the control unit controls the printing module to print the calibrated scanned image on the printing surface of the printing medium and to output the printing medium with the printing surface facing downwardly, the layout orientation of the printed scanned image matches with the layout orientation of the printing medium, and the text orientation of the printed scanned image is opposite to the medium outputting direction or arranged from the proximal end to the distal end of the printing surface of the printing medium. In such a way, when a user takes the printing medium and turns the printing surface to face upwardly, the text orientation of the calibrated scanned image on the printing surface coincides with the reading orientation. Therefore, it is not required to rotate the printing medium, which makes it more intuitive to use the image outputting device of the present invention. Besides, when scanning a plurality of objects with different placing orientations, layout orientations and text orientations of calibrated scanned images are identical. Therefore, it is not required to rotate any printing medium, which brings convenience in use. Furthermore, when the layout size of the scanned image is less than the layout size of the printing medium, the calibrated scanned image can be printed at the central position on the printing surface of the printing medium, which makes reading easier.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An image outputting device capable of calibrating a scanned image, the image outputting device comprising:
a scanning module configured to scan an object to generate the scanned image;
a storage module configured to store the scanned image generated by the scanning module;
an identification module configured to identify an orientation of the scanned image, the orientation comprising a layout orientation and a text orientation;
a calibration module configured to calibrate the orientation of the scanned image stored in the storage module;
a printing module configured to print the calibrated scanned image on a printing surface of a printing medium and to output the printing medium with the printing surface facing downwardly; and
a control unit electrically connected to the scanning module, the storage module, the identification module, the calibration module and the printing module, the control unit controlling the scanning module to scan the object to generate the scanned image and store the scanned image in to the storage module, the control unit further controlling the identification module to identify the layout orientation and the text orientation of the scanned image, the control unit further controlling the calibration module to calibrate the layout orientation and the text orientation of the scanned image according to a relation of an identification result of the identification module and a layout orientation of the printing medium, when the control unit controls the printing module to print the calibrated scanned image on the printing surface of the printing medium and to output the printing medium with the printing surface facing downwardly, the layout orientation of the printed scanned image matching with the layout orientation of the printing medium, and the text orientation of the printed scanned image being opposite to a medium outputting direction or arranged from a proximal end to a distal end of the printing surface of the printing medium.

2. The image outputting device of claim 1, wherein the identification module identifies the text orientation of the scanned image stored in the storage module by optical character recognition or optical graph recognition.

3. The image outputting device of claim 1, wherein the control unit further controls the identification module to identify a layout size of the scanned image for determining whether the layout size of the scanned image is less than a layout size of the printing medium, when the control unit determines the layout size of the scanned image is less than the layout size of the printing medium, the control unit controls the printing module to print the calibrated scanned image at a central position on the printing surface of the printing medium.

4. A method of calibrating and outputting a scanned image by an image outputting device, the method comprising steps of:
utilizing a control unit for controlling a scanning module to scan an object to generate the scanned image and storing the scanned image in a storage module;
utilizing the control unit for controlling an identification module to identify a layout orientation and a text orientation of the scanned image stored in the storage module;
utilizing the control unit for controlling a calibration module to calibrate the layout orientation and the text orientation of the scanned image according to a relation of an identification result of the identification module and a layout orientation of a printing medium; and
utilizing the control unit for controlling a printing module to print the calibrated scanned image on a printing surface of the printing medium and to output the printing medium with the printing surface facing downwardly, wherein when the control unit controls the printing module to print the calibrated scanned image on the printing surface of the printing medium and to output the printing medium with the printing surface facing downwardly, the layout orientation of the printed scanned image matches with the layout orientation of the printing medium, and the text orientation of the printed scanned image is opposite to a medium outputting direction or arranged from a proximal end to a distal end of the printing surface of the printing medium.

5. The method of claim 4, wherein utilizing the control unit for controlling the identification module to identify the layout orientation and the text orientation of the scanned image stored in the storage module comprises:
utilizing the identification module for identifying the text orientation of the scanned image stored in the storage module by optical character recognition or optical graph recognition.

6. The method of claim 4, further comprising steps of:
utilizing the control unit for controlling the identification module to identify a layout size of the scanned image for determining whether the layout size of the scanned image is less than a layout size of the printing medium; and
utilizing the control unit for controlling the printing module to print the calibrated scanned image at a central position on the printing surface of the printing medium when the control unit determines the layout size of the scanned image is less than the layout size of the printing medium.

* * * * *